United States Patent [19]
Skoyles

[11] 3,716,275
[45] Feb. 13, 1973

[54] ANTI-LOCK BRAKE SYSTEMS FOR WHEELED VEHICLES

[75] Inventor: Derek Robert Skoyles, East Grinstead, England

[73] Assignee: U.S. Philips Corp.

[22] Filed: March 5, 1971

[21] Appl. No.: 121,386

[30] Foreign Application Priority Data

March 18, 1970 Great Britain.....................13,146/70

[52] U.S. Cl. ................303/21 AF, 303/21 F, 303/63
[51] Int. Cl. ...........................B60t 8/00, B60t 17/18
[58] Field of Search...303/21 F, 21 AF, 10, 6, 61–63, 303/68–69; 188/181

[56] References Cited

UNITED STATES PATENTS

| | | | |
|---|---|---|---|
| 3,627,386 | 12/1971 | Every | 303/21 F |
| 3,610,701 | 10/1971 | Riordan | 303/21 AF |
| 3,514,160 | 5/1970 | Lieber | 303/21 AF |
| 3,544,171 | 12/1970 | Lester et al | 303/21 AF |
| 3,608,984 | 9/1971 | Skoyles | 303/21 F |
| 3,524,684 | 8/1970 | Skoyles | 303/21 F |

Primary Examiner—Trygve M. Blix
Assistant Examiner—John J. McLaughlin
Attorney—Frank R. Trifari

[57] ABSTRACT

An anti-lock hydraulic brake system having a fluid pressure line connected to the anti-lock control valve. Actuation of the control valve causes displacement of fluid through the valve to relieve brake pressure. A fail-safe arrangement as provided for cutting off the flow when prolonged actuation of the control valve occurs.

4 Claims, 4 Drawing Figures

ANTI-LOCK BRAKE SYSTEMS FOR WHEELED VEHICLES

This invention relates to anti-lock brake systems for wheeled vehicles, that is, brake systems including anti-lock braking control means for improving braking performance of a vehicle by relieving braking pressure applied to a road wheel of the vehicle if the wheel tends to lock on a slippery surface following brake application and then increasing the braking pressure again without the need for any change in the actual braking action (by a person using the brake) causing the brake application. Such systems can be successful in reducing the risk of skidding due to wheel lock and in maintaining directional control during braking, and can also reduce braking distances.

The invention relates more particularly to a fluid-pressure operated anti-lock vehicle brake system of the character comprising, for use in conjunction with a vehicle wheel and associated wheel brake, a wheel movement sensor for producing an output function in dependence on a particular criterion related to wheel rotational movement and control valve means which is arranged for actuation consequent upon said output function being produced to cause braking pressure as applied by a pressure source of the system to the wheel brake to be relieved. A suitable criterion — though not the only one — is when the deceleration of the wheel is in excess of a predetermined value.

Normally, the period during which the control valve means remains actuated to relieve braking pressure is very short (i.e. only a few milliseconds), and the control valve means is released at the end of the period to allow braking pressure to increase again. This normal anti-lock operation to relieve braking pressure and then to allow it to increase again is repeated each time the wheel tends towards a locked condition that could result in skidding during a braking action. However, if there is a malfunction preventing the release of the control valve means following its actuation, then braking pressure would not be increased again by normal anti-lock operation and could continue to fall. Therefore, unless a fail-safe arrangement of some form is provided, which is effective in the event of such a malfunction to over-ride the action of the control valve means and thereby allow braking pressure to be restored, a complete brake failure could result with possible serious consequences.

Another malfunction, which is thought to be more serious, is one in which the control valve means has already assumed its actuated condition when brake application occurs so that braking pressure is unable to build-up to achieve effective braking.

It is an object of the present invention to provide an anti-lock vehicle brake system of the character referred to, wherein there is included a fail-safe arrangement which is effective to permit braking pressure to be restored in the event that either of the two malfunctions mentioned above occurs.

According to the present invention an anti-lock vehicle brake system of the character referred to includes, in communication with a fluid pressure line which is connected to the anti-lock control valve means of the system and through which fluid is displaced when the anti-lock control valve means is actuated to relieve braking pressure, a fail-safe arrangement comprising fluid cut-off means, and biasing means for mechanically biasing said fluid-cut off means towards a first position at which it can be entrained by sustained flow of displaced fluid in said fluid pressure line for displacement to a second position at which it forms a seal preventing further flow of displaced fluid.

Such a fail-safe arrangement is preferably so arranged that the action of the biasing means on the fluid cut-off means is nullified by the fluid pressure that will exist in said fluid pressure line during normal anti-lock operation so that it cannot bias the fluid cut-off means into said first position during such operation, the fail-safe arrangement being further so arranged that if prolonged actuation of the anti-lock control valve means occurs, due to a malfunction, so that there is a sustained flow of displaced fluid in said fluid pressure line the consequential reduction of fluid pressure in said fluid pressure line will allow the biasing means to bias the fluid cut-off means into said first position at which it will be entrained by the sustained flow of fluid and thereby be displaced to said second position.

Thus, if the anti-lock control valve means remains actuated during or following an anti-lock action, due to a malfunction, the pressure of the fluid in said pressure line will reduce as fluid is displaced through said control valve means until the biasing means becomes effective to displace the fluid cut-off means to said first position from which it is moved by flow of displaced fluid to said second position to prevent further escape of fluid, so that fluid pressure in said fluid pressure line can build-up again in response to continued braking action. On the other hand, if the control valve means is already actuated, due to a malfunction, when a braking action occurs, the fluid cut-off means will already be in said first position so that there is little loss of fluid and braking pressure can build-up normally in response to the braking action once the fluid cut-off means has been moved by an initial sustained flow of displaced fluid to said second position.

In carrying out the invention, the fail-safe arrangement may comprise, as said biasing means, a first piston arranged for displacement in one direction under spring-biasing to urge said fluid cut-off means towards said first position, said first piston being further arranged for displacement in the opposite direction in response to fluid pressure in said fluid pressure line which is sufficient to overcome its spring-biasing, the fail-safe arrangement further comprising, as said fluid cut-off means, a second piston having a sealing member for sealing the fluid pressure line and being so arranged that once it has been displaced to said second position a subsequent build-up of fluid pressure in said fluid pressure line will not cause its displacement therefrom, notwithstanding the displacement of said first piston against its spring-biasing.

In order that the invention may be more fully understood reference will now be made by way of example to the drawings accompanying the Provisional Specification of which:

Figure 1:
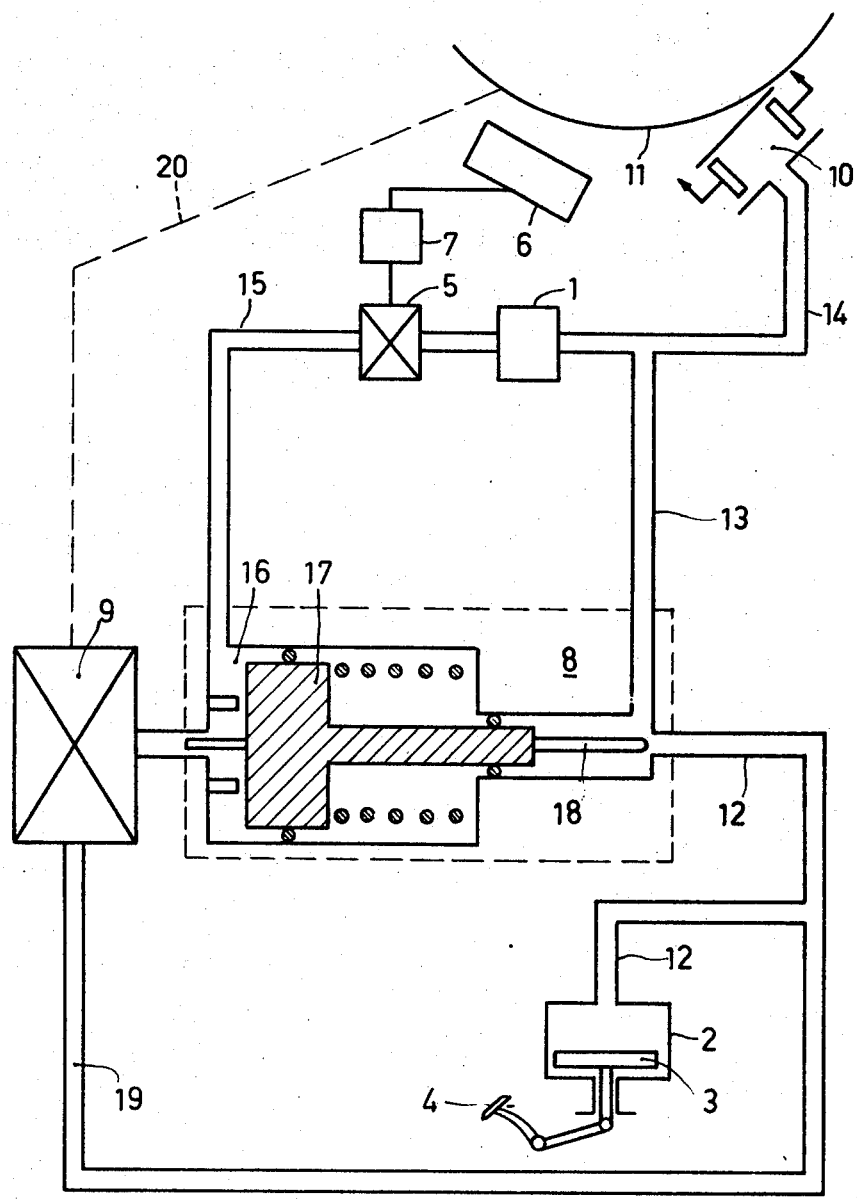
FIG. 1 show diagrammatically an anti-lock vehicle brake system of the character referred to including a fail-safe arrangement in accordance with the invention.

Referring to the drawings, in FIG. 1 a fail-safe arrangement 1 is provided in a particular form of anti-lock vehicle brake system which is described in greater detail than herein in co-pending U.S. Pat. Application Ser. No. 215,622. This system is a master cylinder type hydraulic system comprising a master cylinder 2 having a piston 3 which is actuable by a brake pedal 4. The system further comprises an anti-lock control valve 5, a wheel sensor 6, an electrical control arrangement 7, a braking pressure control unit 8 and a scavenging pump 9. A vehicle brake 10 for a wheel 11 is controlled by this system.

In operation of the system of FIG. 1, for normal brake application, fluid in pressure lines 12 to 14 is pressurized by the master cylinder 2 to an extent determined by a driver's braking action and this produces a corresponding braking pressure in the brake 10. If the driver's braking action is likely to cause skidding due to the wheel locking, this is detected by the wheel sensor 6 and electrical control arrangement 7, and the control valve 5 is actuated. Details of the manner of operation and composition of the elements 5, 6 and 7 are not thought to be necessary for an understanding of the present invention, but an example is given in the aforementioned co-pending application Ser. No. 215,622.

As a result of the actuation of the control valve 5, some of the fluid under pressure in the pressure lines 13 and 14 is displaced into a fluid pressure line 15, thereby relieving braking pressure. This displaced fluid enters a reservoir 16 of the braking pressure control unit 8 where it is applied behind a spring-loaded plunger 17 and displaces this plunger to the right (as seen in the drawing), so that a restrictor 18 on the plunger 17 enters the pressure line 13, thereby restricting flow of fluid through this line to the line 14. Braking pressure is now reduced to an extent determined by the extent of displacement of the piston 17 to the right and thus to the volume of displaced fluid. For normal anti-lock operation the control valve 5 remains actuated for only the short time required to allow the braking pressure to fall sufficiently low for the wheel to reaccelerate. Once the control valve 5 is released, the pump 9 which is returning fluid from the reservoir 16 of the braking pressure control unit 8 to the pressure line 13 via a pressure line 19, gradually removes sufficient fluid from the reservoir 16 for the plunger 18 to return under its spring-loading towards its normal position, to increase the rate of braking pressure build-up. As indicated by the broken line 20, the pump 9 can be driven by the wheel 11.

From the foregoing description it will be appreciated that if the control valve 5 remains actuated, due to a malfunction in the system, fluid needed in lines 13 and 14 to produce braking pressure would continue to be displaced through the control valve 5, with the result that, with the system as so far described, braking pressure would fall to a dangerously low value. The lowest value to which the braking pressure can fall is, in fact, the value of the reservoir pressure, that is, the pressure of fluid in the reservoir 18. The value of the reservoir pressure will therefore be the lowest value of braking pressure which the anti-lock brake system can produce if the control valve 5 remains actuated due to a malfunction. In order to prevent the braking pressure falling to this dangerously low value, the fail-safe arrangement 1 is provided.

Figure 2:
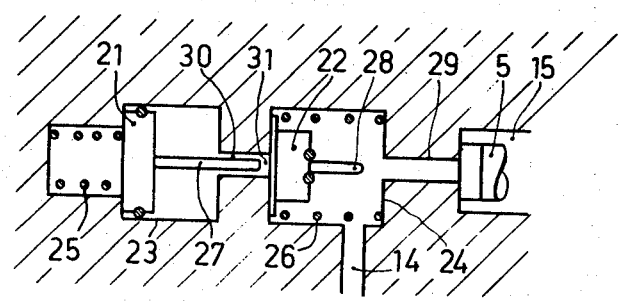
FIGS. 2 and 3 show diagrammatically the elements of the fail-safe arrangement in the system of FIG. 1.
Figure 3:
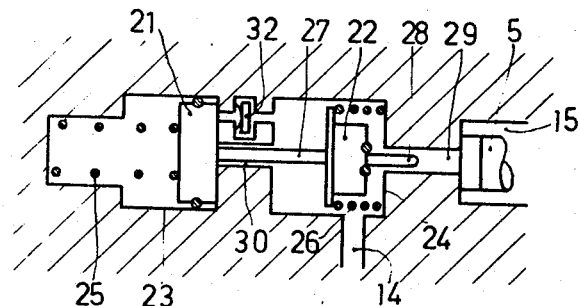

Turning now to FIGS. 2 and 3, which show an embodiment of the fail-safe arrangement 1 in FIG. 1, this arrangement comprises two pistons 21 and 22 in respective chambers 23 and 24. A spring 25 tends to urge piston 21 to the right and a spring 26 tends to urge piston 22 to the left, as seen in the drawing. The chamber 24 is in communication with the fluid pressure line 14 which is connected to the anti-lock control valve (5-FIG.1) from the brake (10-FIG.1) 1) In FIG. 2, the position of pistons 21 and 22 are in the "brakes on" condition and in FIG. 3 they are in the "brakes off" condition. Consider firstly the "brakes-off" condition, with the anti-lock control valve unactuated and in the absence of braking pressure, spring 25 urges piston 21 to the right and stem 27 on piston 21 engages 31 with piston 22 to urge it to the right also against the action of spring 25. The relative strengths of the two springs 25 and 26 are such that the piston 22 is held mechanically biased at a first position with its stem 28 inserted into the bore 29 leading to the control valve 5. If braking pressure is now applied with the anti-lock control valve unactuated, piston 21 is urged to the left when the force exerted by the fluid pressure on the piston 21 exceeds the force exerted by spring 25. As a result, piston 22 is urged to the left by spring 26 and the two pistons 21 and 22 will assume the "brakes on" condition shown in FIG. 2. It will be apparent that if piston 22 seals chamber 23 from chamber 24 then the force exerted by the fluid pressure on piston 21 will be removed, and spring 25 will urge piston 21 to the right so that its stem 27 engages with piston 22 to displace it from such sealing position. Piston 21 will then be urged to the left again by the fluid pressure and piston 22 also, and so on. These minor fluctuations in the positions of pistons 21 and 22 in the "brakes on" condition are not relevant to antilock operation, the sole requirement being that in the "brakes on" condition, with the control valve unactuated, the piston 22 is withdrawn from said first position.

Figure 4:
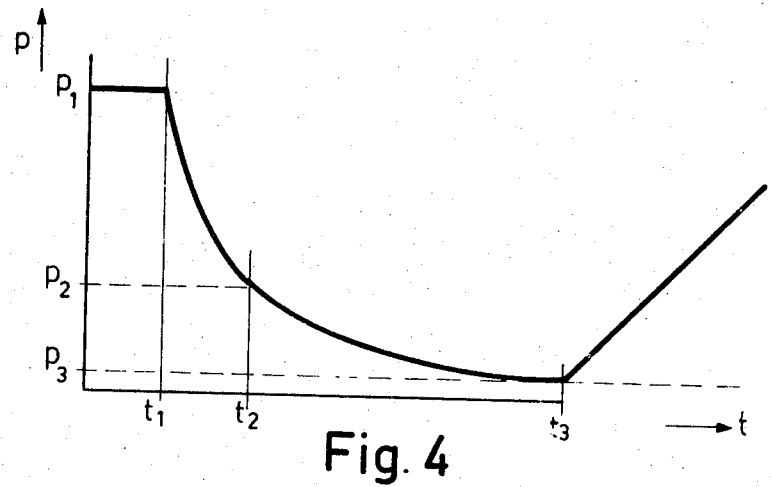
FIG. 4 shows a pressure/time graph which is illustrative of the operation of the fail-safe arrangement of FIGS. 2 and 3.

Consider now the actions within the fail-safe arrangement during anti-lock operation. FIG. 4 shows a curve of braking pressure against time when the control valve (5) is opened at a time $t_1$. The braking pressure falls until a time $t_2$, where the spring force of 25 divided by the area of piston 21, equals the force exerted on piston 21 by the braking pressure: thereafter piston 21 moves to the right. However, the fluid displaced by piston 21 in its movement to the right is impeded by a restriction 30 so that this movement is slowed up. At a time $t_3$ the movement has been sufficient to push the piston 22 into said first position in which its stem 28 enters the bore 29 leading to the control valve 5. For normal anti-lock operation the control valve would be released after a short period and as braking pressure is re-established piston 21 returns to the left followed by piston 22.

Thus the pressure has been allowed to fall to a low value, e.g. to allow for ice without the fail-safe arrangement becoming operative.

However, if there is a prolonged actuation of the anti-lock control valve a fault is assumed and braking pressure is restored by the fail-safe arrangement as follows. With braking pressure low so that piston 22 is in said first position, sustained flow of fluid through the anti-lock control valve due to its prolonged actuation will entrain the piston 22 and carry it to the right to seal off the control valve. Full braking pressure can now be established in the brake even with the control valve held actuated due to a fault condition.

If brake application takes place with the control valve permanently energized (worst fault condition), the piston 22 which will already be in the "brakes off" condition, will be carried to the right almost immediately by the flow of fluid through the anti-lock control valve to seal off the latter. The control valve is therefore sealed before pressure rises above, say 100 PSI. Further pressure rise causes piston 21 to move to the left, but this is not a useful movement. Normal braking pressures are now possible.

To allow for old and sticky elements of the system where the pressure does not fall to a very low value, the force of spring 25 must always be higher than the upper value of lowest pressures. The restriction 30 than becomes necessary to avoid the fail-safe arrangement becoming operable at time $t_2$ during a genuine anti-lock operation.

In FIG. 3, a one way valve 32 has been included across the restriction 30 to cater for rapid applications of brakes on very slippery road surfaces, e.g. wet ice. In such road conditions it may otherwise be possible due to a prolonged actuation of the anti-lock control valve and the low value of braking pressure which would cause wheel locking for the piston 22 to be entrained by flow fluid through the control valve before the braking pressure can displace piston 21 to the left to allow piston 22 to be displaced to the left away from said first position. The one way valve 32 allows immediate movement of piston 21 to the left without "slugging" by restriction 30, so that piston 22 is more quickly displaced from said first position.

Although the invention has been exemplified as applied to a brake system in which brake application is effected by directly acting master cylinder pressure without servo assistance, it is to be appreciated that the invention could also be applied to servo-assisted master cylinder type systems and also to systems of the continuously pumped type in which fluid, pumped continuously to supply circulation of fluid under pressure, is fed to a wheel brake to an extent determined by operation of a brake pedal by a driver, the requirement in each case being that the fail-safe arrangement according to the invention is located in a fluid pressure line connected to the anti-lock control valve of the system to control the passage of fluid displaced through the control valve under conditions of malfunction, as aforesaid.

What we claim is:

1. A fail-safe arrangement for an anti-lock vehicle braking system having an anti-lock control valve connected to a fluid pressure line in which fluid is displaced when said anti-lock control valve is actuated to relieve braking pressure, said fail-safe arrangement comprising:

A. A fluid cut-off means supported by a first movable member, and movable with said member between a fluid cut-off position and a fluid flow position;

B. biasing means urging said movable member and consequently said fluid cut-off means to said fluid flow position;

C. means communicating with said fluid pressure line and acting upon said movable member urging said member and consequently said fluid cut-off means to said cut-off position when there is a prolonged actuation of said anti-lock control valve causing a sustained flow of fluid in said fluid pressure line and a consequential reduction of fluid pressure in said fluid pressure line, said means being nullified by fluid pressure existing in the fluid pressure line during normal anti-lock operation so that said means cannot urge the movable member and consequently said fluid cut-off means into said fluid cut-off position, said means comprising a second movable member biased for displacement in an opposite direction to said first movable member, said first movable member being displaced against its biasing in response to a fluid pressure sufficient to overcome its biasing, said first movable member engaged and biased by said second movable member to provide said fluid cut-off means in its cut-off position, said movable members so arranged that once the first member and said fluid cut-off means have moved to the cut-off position said first movable member and said fluid cut-off means will be maintained in said cut-off position notwithstanding displacement of the second movable member against its biasing and away from engagement with said first movable member.

2. The fail-safe arrangement of claim 1, wherein said second movable member is a piston displaceable within a first chamber which communicates with a second chamber through a restriction into which extends a stem provided on said piston, said first movable member also being a piston with a stem thereon which is displaceable in said second chamber, said second chamber having an inlet and an outlet bore through which displaced fluid flows when the control valve means is actuated, and wherein the stem of said second piston extends into said outlet bore to act as said cut-off means for cutting off the flow of said fluid, and further wherein said first piston stem serving to engage said second piston through said restriction for the purpose of urging said second piston to advance its stem into said outlet bore when said first piston is displaced toward said second piston.

3. The fail-safe arrangement of claim 2, wherein said first and second pistons are each biased toward each other by springs.

4. The fail-safe arrangement of claim 2, further comprising a one-way valve located and communicating between said first and second chambers for the purpose of by-passing said restriction and allow fluid pressure to act on said first piston otherwise than through said restriction to displace said first piston in a direction opposite its biasing.

* * * * *

UNITED STATES PATENT OFFICE
CERTIFICATE OF CORRECTION

Patent No. 3,716,275     Dated February 13, 1973

Inventor(s) DEREK ROBERT SKOYLES

It is certified that error appears in the above-identified patent and that said Letters Patent are hereby corrected as shown below:

Column 6, line 7, change "to" to --towards--

Column 6, line 12, after "line," insert --said sustained fluid flow causing entrainment of said movable member to said cut-off position,--

Column 6, line 17, change "into" to --towards--

Signed and sealed this 13th day of November 1973.

(SEAL)
Attest:

EDWARD M. FLETCHER, JR.
Attesting Officer

RENE D. TEGTMEYER
Acting Commissioner of Patents